(12) United States Patent
Kent et al.

(10) Patent No.: US 10,476,778 B2
(45) Date of Patent: Nov. 12, 2019

(54) LAN TESTING SYSTEM

(71) Applicant: IDEAL INDUSTRIES NETWORKS LIMITED, High Wycombe (GB)

(72) Inventors: Peter Kent, Stokenchurch (GB); Ian Mercer, Stokenchurch (GB)

(73) Assignee: Ideal Industries Networks Limited (GB)

( * ) Notice: Subject to any disclaimer, the term of this patent is extended or adjusted under 35 U.S.C. 154(b) by 256 days.

(21) Appl. No.: 15/338,547

(22) Filed: Oct. 31, 2016

(65) Prior Publication Data

US 2018/0123937 A1 May 3, 2018

(51) Int. Cl.
*H04L 12/26* (2006.01)

(52) U.S. Cl.
CPC .............. *H04L 43/50* (2013.01); *H04L 43/12* (2013.01)

(58) Field of Classification Search
None
See application file for complete search history.

(56) References Cited

U.S. PATENT DOCUMENTS

| | | | |
|---|---|---|---|
| 5,285,163 A | 2/1994 | Liotta | |
| 6,434,716 B1 * | 8/2002 | Johnson | G01R 31/31915 370/213 |
| 6,998,853 B2 | 2/2006 | Renken | |
| 2005/0174949 A1 * | 8/2005 | Renken | H04B 3/462 370/248 |
| 2007/0260927 A1 * | 11/2007 | Smith | G06F 11/2294 714/37 |
| 2014/0117992 A1 * | 5/2014 | Matlock | F02N 11/006 324/380 |
| 2016/0359371 A1 * | 12/2016 | Wikstrand | G01R 31/42 |

FOREIGN PATENT DOCUMENTS

| | | | |
|---|---|---|---|
| DE | 202007004303 U1 * | 5/2007 | H04L 43/50 |
| DE | 202007004303 | 6/2007 | |

OTHER PUBLICATIONS

European Patent Office, extended European search report issued on European patent application No. 17199164.9, dated Mar. 5, 2018, 8 pages.

* cited by examiner

*Primary Examiner* — Noel R Beharry
*Assistant Examiner* — Pamit Kaur
(74) *Attorney, Agent, or Firm* — Cook Alex Ltd.

(57) ABSTRACT

A system for use in testing a local area network (LAN) cabling system having a LAN cable communicatively coupled to a pair of sockets. The system includes a first LAN testing device that is adapted to exchange test communication signals with a second LAN testing device through the LAN cabling system and a cable communicatively coupled to the first LAN testing device having a plug sized and arranged to communicatively couple with a one of the pair of sockets. The plug includes a switch device and an indicator device that are communicatively coupled to the first LAN testing device via the cable. The first LAN testing device is programmed to initiate one or more LAN cabling test procedures in cooperation with the second LAN testing device in responsive to a first signal received from the plug via the cable as a result of the switch device being actuated and to provide one or more signals to the indicator device via the cable to thereby cause the indicator device to indicate a condition associated with a result of the initiated one or more LAN cabling test procedures.

17 Claims, 3 Drawing Sheets

US 10,476,778 B2

LAN TESTING SYSTEM

BACKGROUND

The following generally relates to local area network (LAN) testing equipment and, more particularly, relates to an improved LAN testing system.

LAN cabling is commonly used to connect equipment such as personal computers, printers, and other machines that pass information using high-speed digital signals. By way of example only, prior art FIG. 1 illustrates how LAN cabling 3, most of which runs within the walls of a building, is used to communicatively couple a first piece of equipment 1 to a second piece of equipment 2. Wall sockets, such as RJ45 connector sockets, associated with the LAN cabling 3 are used to receive corresponding plugs 4 provided to one end of cables 5 while the other end of the cables 5 are provided with a plug (as needed) for connecting the cable 5 to the piece of equipment. Via use of the cables 5 and plugs as connected to the LAN cabling 3 and the first and second pieces of equipment 1 and 2, respectively, the first and second pieces of equipment 1 and 2 are linked for communication.

To test a LAN cabling system, e.g., to check the performance of a communication link that is provided via use of the LAN cabling 3, LAN testers are commonly used. To this end, a first LAN tester 6A, shown by way of further example in prior art FIG. 2, is connected to a first end of the LAN cabling 3 (via use of a cord 9 having plugs 4 and 8) and a second LAN tester 6B is connected to a second end of the LAN cabling (via use of a cord 9 having plugs 4 and 8). Once connected to the LAN cabling 3 in this manner, the LAN testers can be used to pass one or more signals through the LAN cabling to thereby test the LAN cabling as more fully described in commonly assigned U.S. Pat. No. 6,998,853 which patent is incorporated herein by reference in its entirety.

When using a LAN tester to test a LAN cabling system (e.g., as described in incorporated U.S. Pat. No. 6,998,853), a user will press a button on a test device to start a test. When the test is complete, the user will look at a display or indicators provided to the test device to see the results of the test. Typically, if the test passed, the user is then required to move the LAN tester plugs 4 of the test devices 10A and 10B from the tested sockets to new sockets with the testing process then being repeated. However, because the cord or cabling provided for use with a LAN tester is generally long, e.g., up to 2M in length, it is seen that the LAN testing devices are often positioned at a distance from the socket being tested which thereby tends to undesirably hinder the ability of the user to quickly perform all of the steps required to ready the test equipment, initiate the performance of a test, and subsequently verify the test results.

SUMMARY

To address this problem among others, the following describes an improved system for use in testing a local area network (LAN) cabling system having a LAN cable communicatively coupled to a pair of sockets. The system includes a first LAN testing device that is adapted to exchange test communication signals with a second LAN testing device through the LAN cabling system and a cable communicatively coupled to the first LAN testing device having a plug sized and arranged to communicatively couple with one of the pair of sockets. The plug includes a switch device and an indicator device that are communicatively coupled to the first LAN testing device via the cable. The first LAN testing device is programmed to initiate one or more LAN cabling test procedures in cooperation with the second LAN testing device in responsive to a first signal received from the plug via the cable as a result of the switch device being actuated and to provide one or more signals to the indicator device via the cable to thereby cause the indicator device to indicate a condition associated with a result of the initiated one or more LAN cabling test procedures.

A better understanding of the objects, advantages, features, properties and relationships of the subject system and method will be obtained from the following detailed description and accompanying drawing that set forth illustrative embodiments that are indicative of the various ways in which the principles expressed hereinafter may be employed.

BRIEF DESCRIPTION OF THE DRAWINGS

For a better understanding of the subject LAN testing system and its method of use, reference may be had to preferred embodiments shown in the following drawings in which.

DETAILED DESCRIPTION

Figure 1:
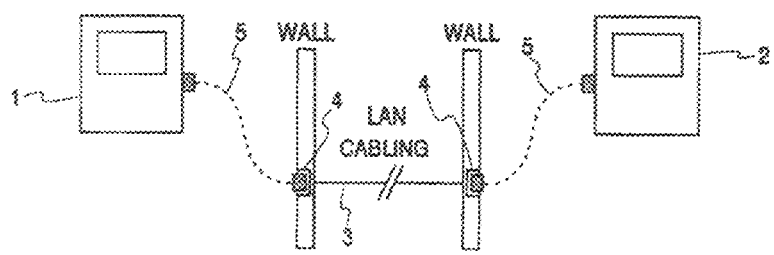
FIG. 1 illustrates a prior art LAN cabling system.
Figure 2:
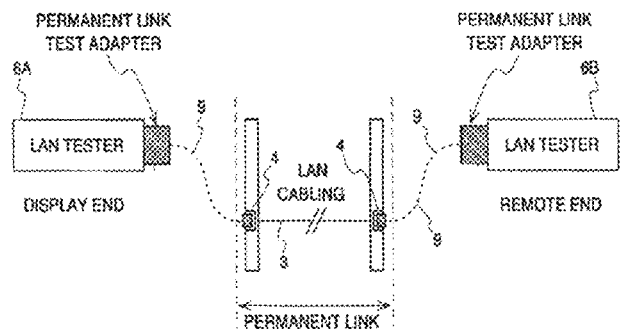
FIG. 2 illustrates a prior art LAN testing system arranged for use in testing a LAN cabling.
Figure 3:
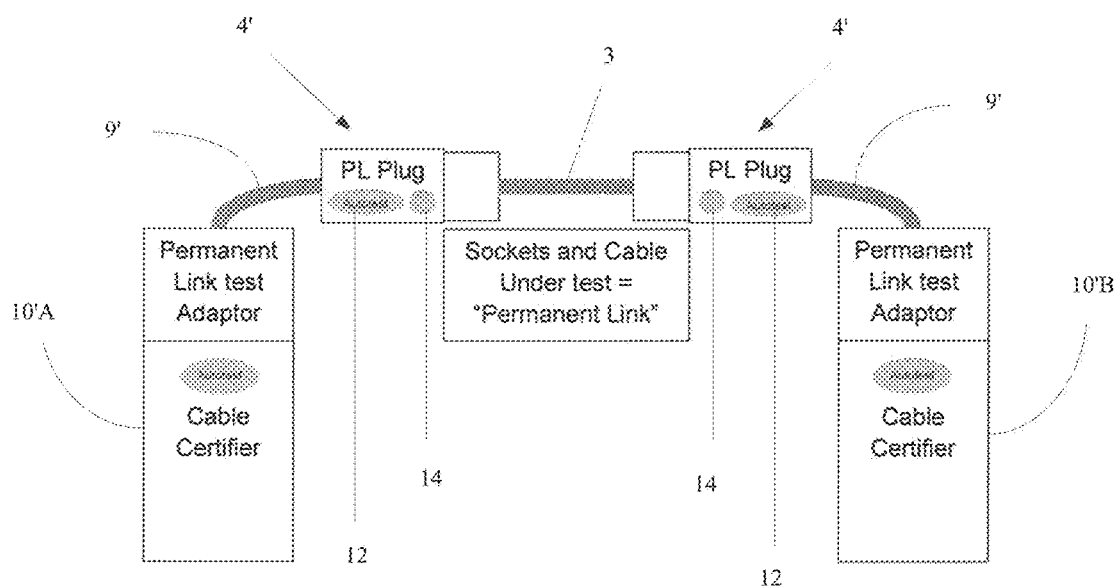
FIG. 3 illustrates a LAN testing system constructed according to the description which follows arranged for use in testing a LAN cabling.
Figure 4:
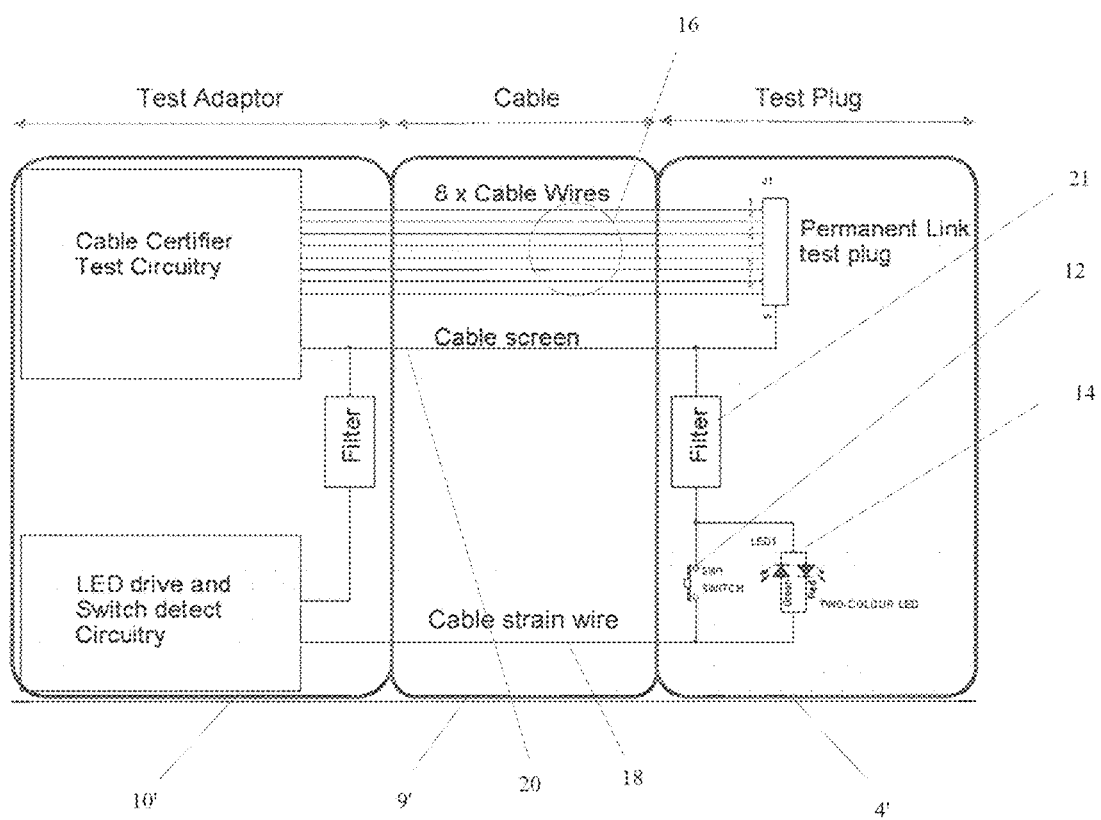
FIG. 4 illustrates a LAN testing device, cable, and test plug of the system of FIG. 3.

With reference to the figures, an improved LAN testing system and method for using the same is now described. More particularly, with reference to FIGS. 3 and 4, the improved LAN testing system includes first and second LAN testing devices 10'A and 10'B which are to be connected to a LAN system to be tested. To connect the LAN testing devices 10'A and 10'B to the LAN system cords 9' are provided. The cords 9' are provided with an improved plug 4' which is adapted to be received in a socket that is associated with the LAN cabling 3, such as a RJ45 connector socket. While the illustrated cord 9' is tethered directly to the corresponding testing device 10', it will be appreciated that the cords 9' may be provided with a plug to allow the cord 9' to be releasably coupled to the testing device 10' as desired. The LAN testing devices 10'A and 10'B may be conventional LAN testing devices, such as described in incorporated U.S. Pat. No. 6,998,853, excepting that the LAN testing devices 10'A and/or 10'B have been modified to be operable with the improved plug 4' as described hereinafter.

To allow a user to quickly initiate the performance of a test of a LAN system connected to the LAN testing system and to allow the user to quickly verify the results of an initiated test, the plug 4' of a cable 9' that is connected to at least one of the testing devices 10'A and 10'B is provided with a switch device 12 and an indicator device 14. The switch device 12 and the indicator device 14 of the plug 4' are, in turn, communicatively coupled with the corresponding one of the test devices 10'A and 10'B via use of the cable 9'. The switch device 12 may be any type of known switch device, such as a push button type mechanical switch, voice activated switch, light activated switch, motion activated switch, etc. and the indicating device 14 can provide any desired form of user feedback, such as visual, audio, and/or tactile. Accordingly, and by way of example only, the indicating device 14 can be in the form of one or more LEDs, a speaker, a vibrator, or the like. Preferably, the indicator device will be caused by the test device 10' to generate a first indicia to indicate a passed test and a second indicia to indicate a failed test, e.g., to be illuminated in a green color for a pass condition and red for a fail condition, to be illuminated in a steady state for a pass condition and to blink for a fail condition, etc. In addition, the test device 10' may cause the indicator device to indicate further conditions, such as to indicate that the test device 10' cannot perform a test, e.g., because some unknown power source is present on the socket connections.

When using the switch device 12 and the indicating device 14 to communicate a test initiation signal to and to receive indicator driving signals from a corresponding one of the test devices 10', a circuit comprising 2 wires is utilized. To this end and to obviate the need to manufacture a special cable for use within this system, one of the two connections to both the switch device 12 and the indicator device 14 could be made using the central "strain" wire 18 that is often present in high quality cable. Use of the central "strain' wire 18 for this purpose also ensures that any transmitted signals do not interfere in any way with the test measurement signals that are to be generated by the test device 10'A and 10'B. Nevertheless, while it is preferred that none of the wires 16 within the cable 9' that are to be used for test measurements be used to place the test device 10' into communication with the switch device 12 or the indicating device 14, those of skill in the art would appreciate how to devise such a connection. In keeping with the illustrated example, the cable screen 20 of such existing cable may then be used to provide the return path for the signals in which case a filter 21 may be required to isolate the signals used for testing from those used for the switch device 12 and indicator device 14. Furthermore, to allow for the use of the wire 18 for these purposes, it is contemplated that the wire 18 could be driven with different signals to change the state of the indicator device 14 and the switch device 12 could function to change the level of the signal in a way that can be detected by the electronics in the test device 10'. While the foregoing describes a preferred embodiment, those of skill in the art will appreciate that a special cable having the needed wiring can be nevertheless be manufactured as desired.

To cause a test device 10' to initiate a LAN cabling test in such a system, it is contemplated that the user would merely actuate the switch device 12. As noted above, the switch device 12 may be, for example, a push button mechanical switch and its actuation could be detected by having the switch connected in parallel with the indicator device 14, e.g., LEDs, with the test device 10' measuring the voltage across the indicator device 14. In this manner, an actuation of the switch device 12 would be identified by the test device 10' when the voltage reduces to a very low value and, when such a condition is detected, programming of the test device 10' would cause the test device 10' to initiate the performance of one or more LAN cabling testing procedures. It will be appreciated that, in such an implementation, it would be necessary to apply a low voltage to the indicator device 14 (rather than no voltage) when they are intended to be turned off in order to detect a switch press. In the case where the indicator device 14 utilizes LEDs, the nature of LEDs is that they would not illuminate with a sufficiently low voltage. Alternatively, it will be understood that it would be possible to pulse the LEDs for a very short time that would not be visible to a user to thereby allow for the detection of whether or not the switch is pressed during this time. Thereafter, when the testing is completed by the test devices 10'A and 10'B, the test device coupled to the plug 4' can transmit a signal to the indicator device 14 to thereby cause the indicator device 14 to indicate the test results in the manner above described.

While specific details have been described above in reference to the figures provided, it will be appreciated by those skilled in the art that various modifications and alternatives to those details could be developed in light of the overall teachings of this disclosure. Accordingly, the particular arrangements disclosed are meant to be illustrative only and not limiting as to the scope of the invention which is to be given the full breadth of the appended claims and any equivalents thereof.

What is claimed is:

1. A system for use in testing a local area network, LAN, cabling system having a LAN cable communicatively coupled to a pair of sockets, the system comprising:
   a first LAN testing device adapted to exchange test communication signals with a second LAN testing device through the LAN cabling system; and
   a cable communicatively coupled to the first LAN testing device having a plug sized and arranged to communicatively couple with one of the pair of sockets;
   wherein the plug includes a switch device and an indicator device that are communicatively coupled to the first LAN testing device via the cable and wherein the first LAN testing device is programmed to initiate one or more LAN cabling test procedures in cooperation with the second LAN testing device in response to a first signal received from the plug via the cable as a result of the switch device of the plug being actuated and to provide one or more signals to the indicator device of the plug via the cable to thereby cause the indicator device of the plug to indicate a condition associated with a result of the initiated one or more LAN cabling test procedures.

2. The system as recited in claim 1, wherein the switch device comprises a mechanical switch device.

3. The system as recited in claim 1, wherein the switch device comprises a sound activated switch device.

4. The system as recited in claim 1, wherein the switch device comprises a motion activated switch device.

5. The system as recited in claim 2, wherein the switch device comprises a push button type switch.

6. The system as recited in claim 1, wherein the indicator device comprises one or more illuminable devices.

7. The system as recited in claim 6, wherein the one or more illuminable devices comprise light emitting diodes.

8. The system as recited in claim 6, wherein the one or more illuminable devices comprise lamps.

9. The system as recited in claim 1, wherein the indicator device comprises a speaker.

10. The system as recited in claim 1, wherein the indicator device comprises a vibrating device.

11. The system as recited in claim 1, wherein the switch device and the indicator device are communicatively coupled to the first LAN testing device via use of one or more wires of the cable that are separate and apart from wires of the cable that are used by the first LAN testing device to communicate test signals to the second LAN testing device.

12. The system as recited in claim 11, wherein the switch device and the indicator device are communicatively coupled to the first LAN testing device via use of at least a cable strain wire of the cable.

13. The system as recited in claim 12, wherein the switch device and indicator device are further communicatively coupled to the first LAN testing device via use of a cable screen of the cable.

14. The system as recited in claim 1, wherein the first signal received from the plug via the cable as a result of the switch device of the plug being actuated is indicative of a voltage drop across the indicator device of the plug resulting from the switch device being actuated.

15. The system as recited in claim 14, wherein the indicator device comprises one or more LEDs.

16. The system as recited in claim 15, wherein the first LAN testing device provides a low voltage signal to the one or more LEDs to thereby allow a voltage drop across the indicator device to be sensed by the first LAN testing device.

17. The system as recited in claim 16, wherein the low voltage signal comprises a pulsed low voltage signal.

* * * * *